United States Patent
Shani

(10) Patent No.: US 9,140,028 B2
(45) Date of Patent: Sep. 22, 2015

(54) AUTOMATED PARKING SYSTEM

(71) Applicant: Unitronics Parking Solutions Ltd., Airport (IL)

(72) Inventor: Haim Shani, Shoham (IL)

(73) Assignee: Unitronics Automated Solutions Ltd, Airport (IL)

( * ) Notice: Subject to any disclaimer, the term of this patent is extended or adjusted under 35 U.S.C. 154(b) by 47 days.

(21) Appl. No.: 13/573,667

(22) Filed: Oct. 3, 2012

(65) Prior Publication Data

US 2013/0085596 A1 Apr. 4, 2013

Related U.S. Application Data

(60) Provisional application No. 61/542,481, filed on Oct. 3, 2011.

(51) Int. Cl.
| | |
|---|---|
| *G06F 7/00* | (2006.01) |
| *E04H 6/28* | (2006.01) |
| *E04H 6/42* | (2006.01) |
| *G08G 1/14* | (2006.01) |

(52) U.S. Cl.
CPC .............. *E04H 6/285* (2013.01); *E04H 6/424* (2013.01); *G06F 7/00* (2013.01); *G08G 1/14* (2013.01)

(58) Field of Classification Search
None
See application file for complete search history.

(56) References Cited

U.S. PATENT DOCUMENTS

| | | | | |
|---|---|---|---|---|
| 3,333,714 | A | * | 8/1967 | Sermet ........................ 414/239 |
| 5,330,305 | A | | 7/1994 | Go |
| 5,669,753 | A | | 9/1997 | Schween |
| 6,332,743 | B1 | * | 12/2001 | Park et al. .................... 414/234 |
| 6,491,488 | B1 | | 12/2002 | Vita et al. |
| 6,974,293 | B2 | * | 12/2005 | Stokes ......................... 414/236 |
| 7,866,910 | B2 | * | 1/2011 | Gustafson et al. .............. 404/1 |
| 8,011,870 | B2 | | 9/2011 | Venkatraman et al. |
| 2004/0068433 | A1 | * | 4/2004 | Chatterjee et al. .............. 705/13 |
| 2006/0170566 | A1 | * | 8/2006 | Slemmer et al. ........... 340/932.2 |
| 2011/0182703 | A1 | * | 7/2011 | Alan ............................. 414/231 |
| 2013/0078063 | A1 | | 3/2013 | Shani |

OTHER PUBLICATIONS

Transit Oriented Development; located at http://www.vtpi.org/tdm/tdm45.htm; See Parking Management.*

* cited by examiner

*Primary Examiner* — Yolanda Cumbess
(74) *Attorney, Agent, or Firm* — Eitan, Mehulal & Sadot

(57) ABSTRACT

An automated parking system comprising a multi-level vehicle parking structure including multiple parking spaces arranged in one or more rows on each level of said structure; and an automatic vehicle positioning system configured to position and retrieve vehicles in said one or more rows of parking spaces, and further configured to shift a parking space of one or more vehicles in one row for retrieving one or more other vehicles in said row.

17 Claims, 9 Drawing Sheets

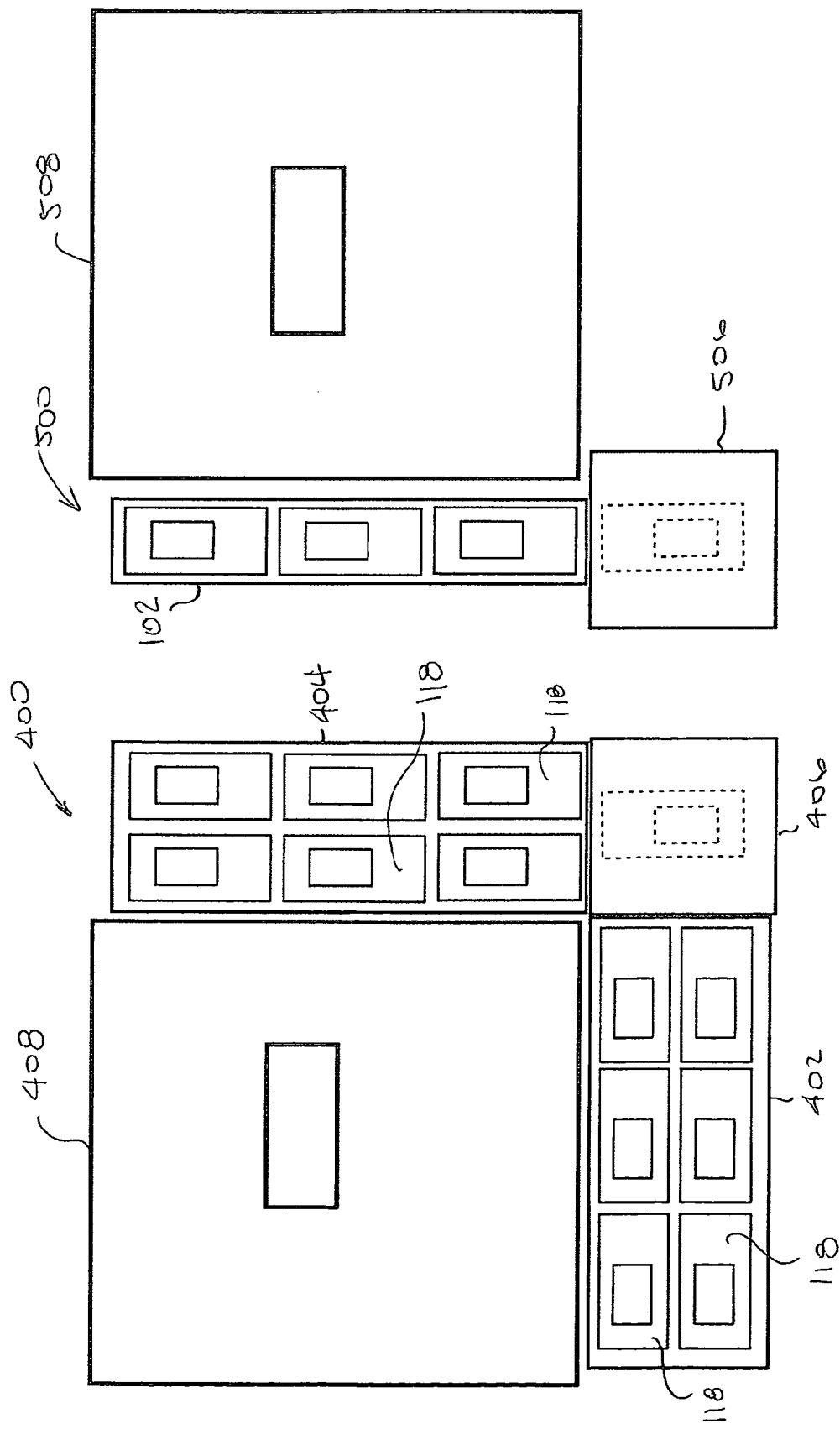
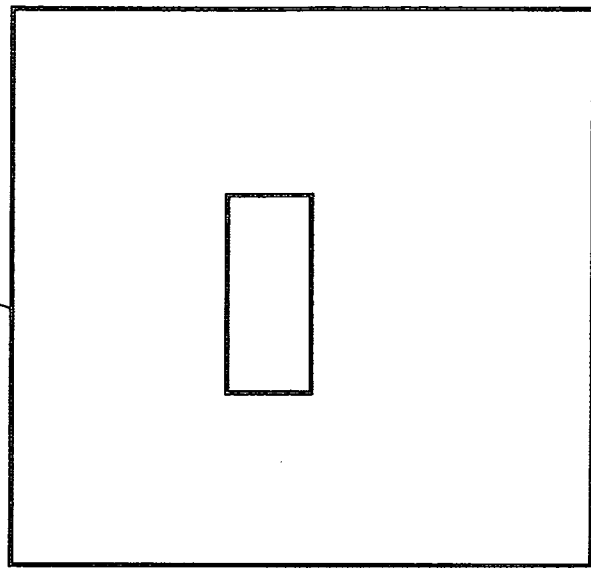
Figure 4B
Figure 4A

AUTOMATED PARKING SYSTEM

CROSS-REFERENCE TO RELATED APPLICATIONS

This application claims benefit from U.S. Provisional Patent Application No. 61/542,481 filed on 3 Oct. 2011, which is hereby incorporated in its entirety by reference.

FIELD OF THE INVENTION

The present invention relates to automated parking systems generally and to an automated parking system suitable for use in limited spaces in particular.

BACKGROUND OF THE INVENTION

Automated parking systems have increased in demand over the last 20 years as the number of automobiles continuously increase worldwide and land availability for parking spaces continuously decrease. This increased demand may be particularly felt in large cities, especially in urban centers, where land is frequently allocated for high-rise office and residential buildings which are occupied by large concentrations of people, many with vehicles, and limited space is allocated for parking purposes.

In an attempt to solve the limited parking space problem, multi-level parking structures able to accommodate a relatively large number of vehicles in each floor are frequently constructed. These may be constructed as separate structures explicitly dedicated to vehicle parking, or as part of a larger structure, for example, a high-rise building with several floors dedicated for parking purposes. Some multi-level parking structures are generally configured to allow vehicles to be driven through each floor by their drivers in search of a parking space. Other types of multi-level parking structures may include automated parking facilities.

Automated parking facilities generally eliminate the need for the vehicle to be driven through the structure. These types of facilities generally include parking slots in each floor into which a driverless vehicle is placed by an automated conveying system. The automated conveying system may also be used to remove the vehicle from the parking slot when the vehicle is returned to the driver. In automated parking facilities, drivers typically self-drive their vehicle into a vehicle entry/exit station where it may be accessed by a transport mechanism which is part of the automated conveyor system. The transport mechanism, which may include a shuttle car, an elevator, a crane, a movable platform, and other type of equipment suitable for moving and/or lifting the vehicle, may load the vehicle and transport it to its respective parking place.

Multi-level parking structures, including those with automated parking facilities, generally require large tracts of land. This is usually a problem in urban centers where the cost of land may be expensive and the availability of the land may be rather low. An example of a vehicle parking structure is described in U.S. Pat. No. 6,491,488 B1 to Vita et al. Other related art includes U.S. Pat. No. 8,011,870 132 to Venkatraman et al., U.S. Pat. No. 5,330,305 to Go, and U.S. Pat. No. 5,669,753 to Schween.

SUMMARY OF THE PRESENT INVENTION

There is provided, according to an embodiment of the present invention, an automated parking system comprising a multi-level vehicle parking structure including multiple parking spaces arranged in one or more rows on each level of the structure; and an automatic vehicle positioning system configured to position and retrieve vehicles in the one or more rows of parking spaces, and further configured to shift a parking space of one or more vehicles in one row for retrieving one or more other vehicles in the row.

According to an embodiment of the present invention, the vehicle positioning system includes a controller; a vehicle registration module for registering entry of the vehicles to the automated parking system; and a vehicle tracking module for storing information associated with a parking location of the vehicles.

According to an embodiment of the present invention, the vehicle positioning system further includes a vehicle transport drive mechanism for operating a vehicle transport mechanism responsive to control signaling from the controller; and a lift drive mechanism for operating a lift responsive to control signaling from the controller.

According to an embodiment of the present invention, the automated parking system further comprises a lift for transporting the vehicles up and down the structure.

According to an embodiment of the present invention, the automated parking system further comprises a platform mounted on the lift for orienting the vehicles in a direction corresponding to a direction of parking.

According to an embodiment of the present invention, the platform is rotatable.

According to an embodiment of the present invention, the automated parking system further comprises a vehicle transport mechanism for moving the vehicles to and from the multiple parking spaces.

According to an embodiment of the present invention, the vehicle transport mechanism includes a shuttle car.

According to an embodiment of the present invention, the multi-level parking structure includes one of an L-shaped configuration, a T-shaped configuration, and an I-shaped configuration.

According to an embodiment of the present invention, the multi-level parking structure includes a central shaft.

According to an embodiment of the present invention, the automated parking system further comprises a car entry/exit station.

According to an embodiment of the present invention, the vehicle positioning system further includes parking space sensors.

There is provided, according to an embodiment of the present invention, a method of automatically parking a vehicle in a multi-level parking structure including multiple parking spaces arranged in one or more rows on each level comprising registering a vehicle by inputting vehicle registration information into a vehicle registration module of a vehicle positioning system; storing the vehicle registration information in a vehicle tracking module in the vehicle position system; and determining using a controller a parking space for the vehicle based on the stored vehicle registration information.

According to an embodiment of the present invention, the method further comprises sending control signals from the controller to a lift drive mechanism; and sending control signals from the controller to a vehicle conveyor drive mechanism.

According to an embodiment of the present invention, the method further comprises positioning the vehicle on a rotatable platform on a lift; transporting the vehicle on the lift to one of the levels of the parking structure; and moving the vehicle from the platform to the parking space using a vehicle transport mechanism.

According to an embodiment of the present invention, the method further comprises automatically retrieving the vehicle from the multi-level parking structure comprising inputting a request for vehicle retrieval into the vehicle registration module; processing the request for vehicle retrieval by the controller; recalling a parking location for the vehicle from the vehicle tracking module; sending control signals from the controller to a lift drive mechanism; and sending control signals from the controller to a vehicle conveyor drive mechanism.

According to an embodiment of the present invention, the method further comprises moving a lift to a level of the parking space of the vehicle; loading one or more vehicles in a row including the parking space of the vehicle onto the lift using a vehicle transport mechanism; and positioning said vehicle bumper-to-bumper with other vehicle in said row.

According to an embodiment of the present invention, the method further comprises moving the one or more vehicles to parking spaces on one or more levels of the parking structure.

According to an embodiment of the present invention, the method further comprises transporting the vehicle to a car entry/exit station using the lift.

According to an embodiment of the present invention, the method further comprises positioning the vehicle in a direction for driving away from the car entry/exit station.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A schematically illustrates a top view of an exemplary L-shaped automated parking system including two rows of parking in each wing, according to an embodiment of the present invention;

FIG. 4B schematically illustrates a top view of an exemplary single-wing I-shaped automated parking system, according to an embodiment of the present invention;

Figure 1A:
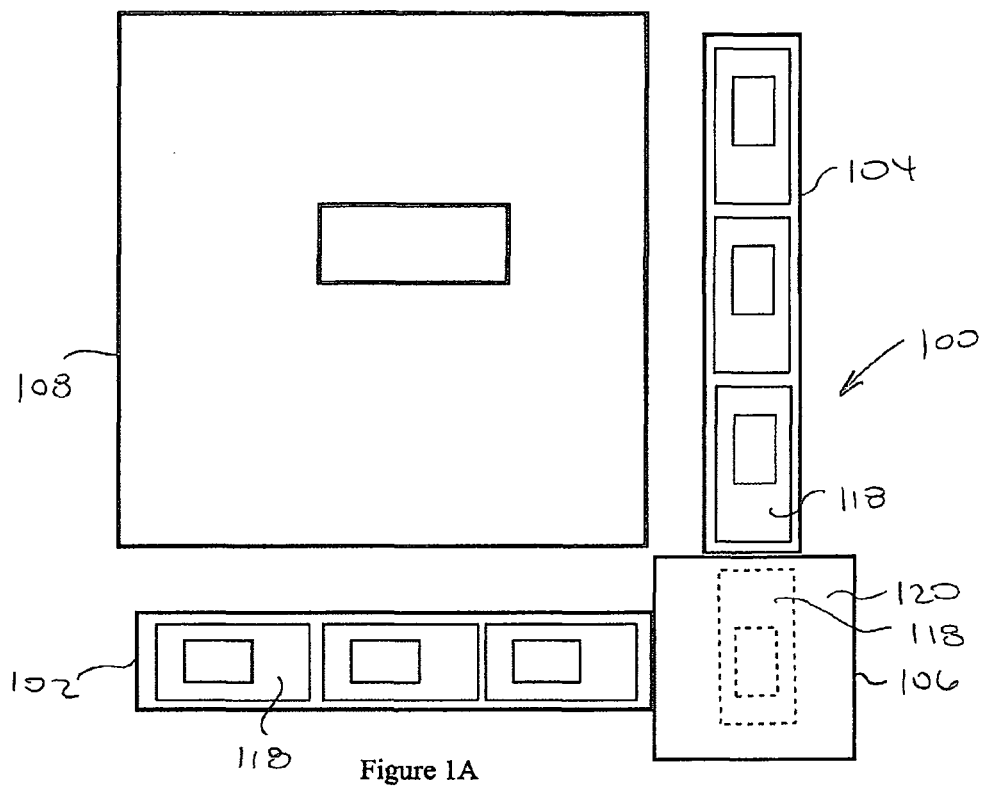
FIGS. 1A and 1B schematically illustrate a top view and a side view, respectively, of an exemplary L-shaped automated parking system, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have devised an automated parking system adapted to fit into relatively narrow tracts of land, for example, between buildings and other types of boundary-forming structures, allowing multiple parking spaces to be created in areas which would otherwise be unsuitable for such a purpose. The automated parking system may include a structure having one or more multi-level parking wings, each wing configured to accommodate one or more rows of vehicles in each floor. The automated parking system may additionally include a vehicle positioning system which controls automatic moving of vehicles in and out of parking spaces, and which automatically tracks the location of the vehicles as they are moved in and out of the parking spaces.

Applicants have realized that substantially high vehicle occupancy in the automated parking system may be obtained by arranging the vehicles in one or more rows in each floor, and by placing the vehicles bumper-to-bumper. Additionally or alternatively, the vehicles may be placed door-to-door. Shift spaces may be provided in one or more floors to accommodate vehicles which may interfere with moving vehicles in and out of a row. A minimum number of shift spaces in an automated parking system may be one less than a maximum number of vehicles fitting into any one single row.

Figure 1B:
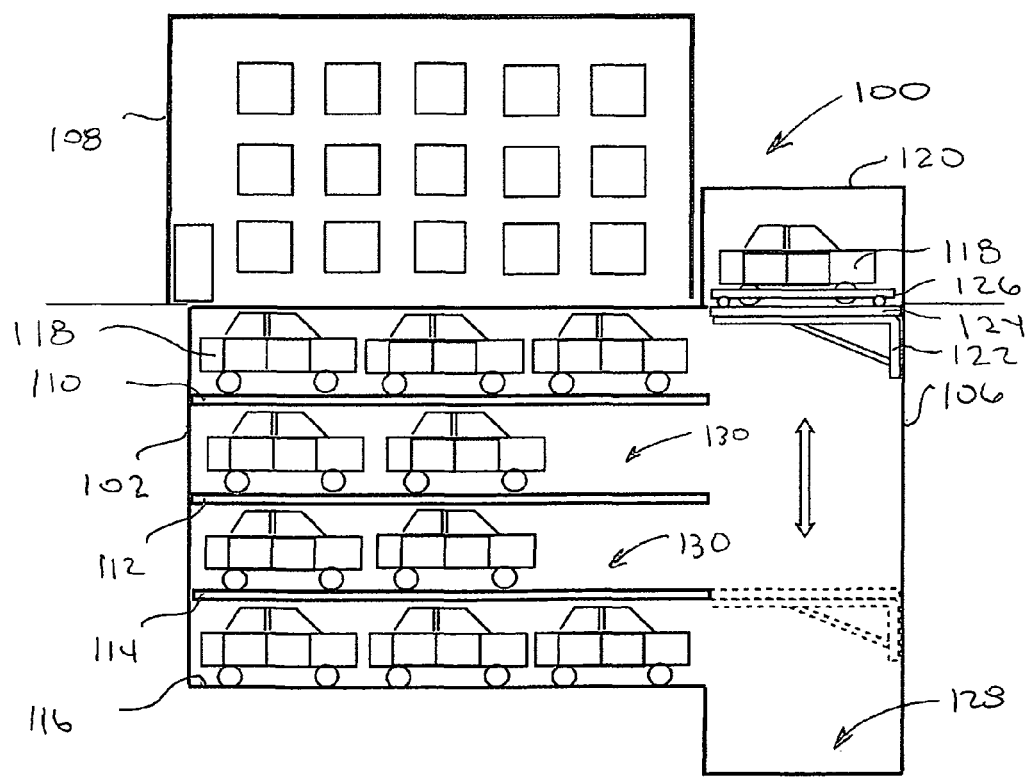

Reference is now made to FIGS. 1A and 1B which schematically illustrate a top view and a side view, respectively, of an exemplary L-shaped automated parking system 100, according to an embodiment of the present invention. Automated parking system 100 may include a first multi-level parking wing 102, a second multi-level parking wing 104 substantially perpendicularly oriented with respect to the first multi-level parking wing, and a central shaft 106 connecting the two wings. First multi-level parking wing 102, second multi-level parking wing 104, and central shaft 106, may be built partially or wholly underground in a relatively narrow tract of land bordering a building 108 or other type of boundary structure which may include streets, parks, houses, or otherwise occupied land areas, and possibly waterfronts. Alternatively, first multi-level parking wing 102, second multi-level parking wing 104, and central shaft 106, may be built above ground in the narrow tract of land. First multi-level parking wing 102, second multi-level parking wing 104, and central shaft 106 may be built using any method known in the art, and may include metallic structures, concrete structures, wood structures, or any combination thereof. First multi-level parking wing 102 and second multi-level parking wing 104 may be substantially similar structures and may have a substantially same parking floor area, same number of levels, and the like. Alternatively, first multi-level parking wing and second multi-level parking wing may be substantially different structures, and may have different size parking floor areas and/or different number of levels.

According to an embodiment of the present invention, first multi-level parking wing 102 and second multi-level parking wing 104 may include several levels, for example 4 levels as shown by decks 110, 112, and 114, with the lowest level shown by bottom floor 116, each level configured to hold a row of parked cars 118. For example, as shown in the figure, first multi-level parking wing 102 and second multi-level parking wing 104 may hold in each floor up to three cars 118, not including shift spaces 130. Shift spaces 130 are parking spaces which may be left empty in any level and any row to accommodate cars 118 which are blocking access to other cars lined up in a row. If access is required to a second or third car 118 in a row, then the first car in the row may be moved into shift space 130 to allow access to the second car, and the first two cars may be moved into shift spaces 130 for accessing the last car in the row. As previously mentioned, a minimum number of shift spaces 130 required in automated parking system 100 may be one space less than a maximum number of cars 118 that fit into any single row in first multi-level parking wing 102 or second multi-level parking wing 104. Cars 118 may be lined up bumper-to-bumper as shown. Additionally or alternatively, cars 118 may be lined up door-to-door in first multi-level parking wing 102 and in second multi-level parking wing 104. Alternatively, cars 118 in one wing may be lined up bumper-to-bumper while in the other wing they may be lined up door-to-door.

Figure 5:
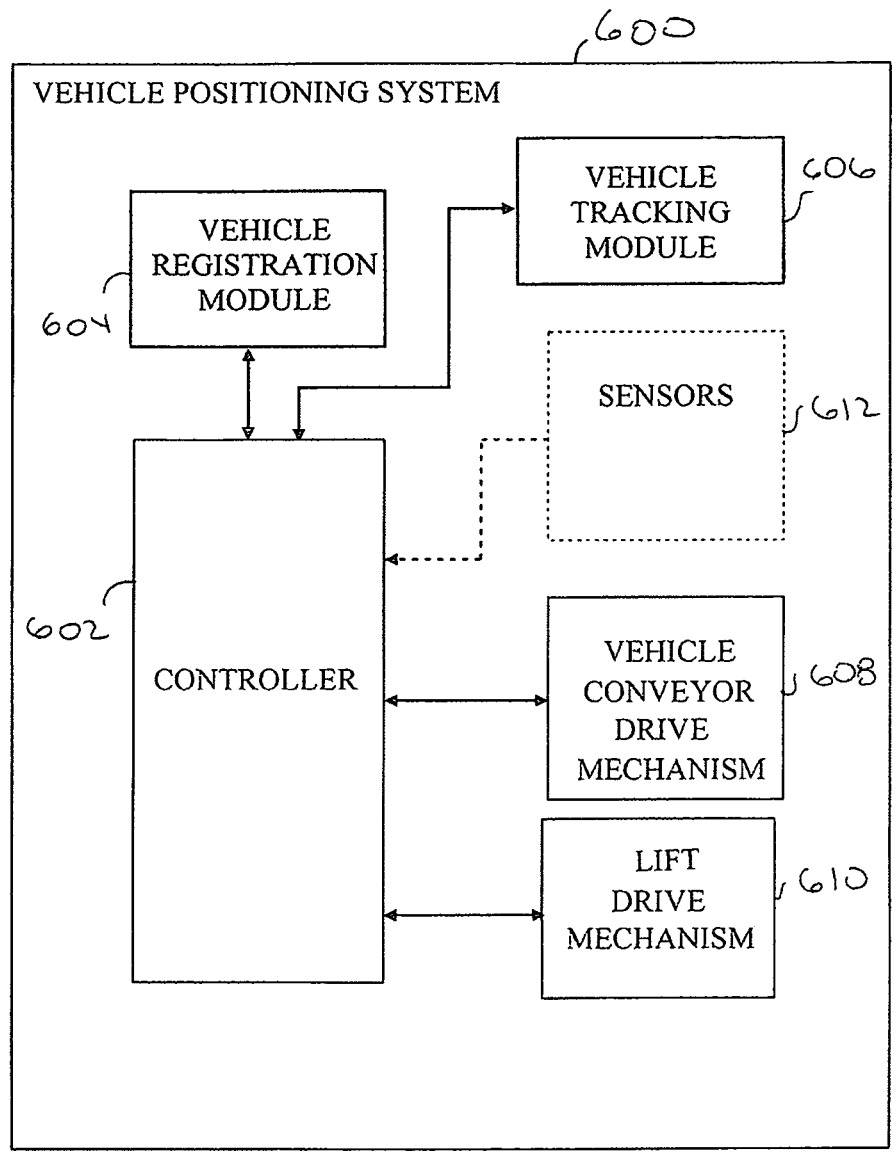
FIG. 5 schematically illustrates a function block diagram of an exemplary vehicle positioning system included in an automated parking system, according to an embodiment of the present invention.

According to an embodiment of the present invention, central shaft 106 may include a car entry/exit station 120 which may be at ground level and into which a car 118 which is to be parked in automated parking system 100 may be driven. Driving of car 118 into car entry/exit station 120 may be done by a driver of the car, or alternatively, by an operator of automated parking system 100. Automated parking system 100 may be a fully automatic system, as will be described later on, and its operation including parking and retrieving of cart 18 may not require any operator intervention. Automatic actions may be performed by a vehicle positioning system (see 500 in FIG. 5) responsive to the driver registering when driving into car entry/exit station 120. Alternatively, automated parking system 100 may be a partially automatic system and may require operator intervention in carrying out some of the functions which may otherwise be carried out by a controller-based system similar to vehicle positioning system 500.

Central shaft 106 may house a lift 122 configured to transport car 118 inside car entry/exit station 120 to any of the four levels of first multi-level parking wing 102 and second multi-level parking wing 104 for parking the car. Lift 122 may be further configured to transport car 118 from any of the four levels to car entry/exit station 120 for returning the car to its driver. Additionally, lift 122 may transport car 118 between the various levels in first multi-level parking wing 102 and second multi-level parking wing 104, for example, when moving the car from one space to another when distributing the cars between the parking spaces. Lift 122 may additionally be configured to raise and lower car entry/exit station 120 so that the station may be lowered underground, alternatively flush with the ground level, when there are no cars 118 inside the station. Central shaft 106 may include a shaft pit 128 for accommodating a bottom section of lift 122 to allow alignment of the lift with floor 116, thereby allowing cars 118 on bottom floor 116 to be loaded onto and unloaded from the lift.

According to an embodiment of the present invention, lift 122 may include a platform 124 onto which car 118 is driven inside car entry/exit station 120, and which supports the car while transported on the lift. Platform 124 may be a rotatable platform which may be rotated to direct car 118 in a direction of first multi-level parking wing 102 and to rotate the car in a direction of second multi-level parking wing 104 according to the wing the car will be parked in. Platform 124 may rotate car 118 so that a forward section of the car faces in the direction of the respective wing where it will be parked, or so that a tail section of the car faces in the direction of the respective wing. Alternatively, platform 124 may rotate car 118 so that doors on one side of the vehicle face in the direction of the wing where it will be parked. Platform 124 may include guiding means, which may include positioning sensors, to guide the driver to properly position car 118 on the platform. Additionally or alternatively, the signaling means may be included in car entry/exit station 120. These may include guide barriers on each side of the vehicle so that the vehicle is properly aligned when positioned between the barriers; markings on the floor of the station such as, for example, lines and arrow, that may be followed by the driver; and electronic means including sensors and display means that may be used to guide the driver, and may include guiding lights and/or a computer display. Additionally or alternatively, platform 124 may additionally include a positioning mechanism which may allow driver-less alignment of the vehicle irrespective of an initial position of car 118 in car entry/exit station 120. The positioning mechanism may automatically align cars 118 on platform 124 with a vehicle transport mechanism 126 mounted on the platform. Applicants have described such a positioning mechanism in U.S. Provisional Application No. 13/625,012 filed on 24 Sep. 2012, incorporated herein by reference in its entirety.

According to an embodiment of the present invention, vehicle transport mechanism 126 may unload cars 118 off lift 122 and onto decks 110, 112, and 114, and bottom floor 116, and may load the cars back onto the lift. Vehicle transport mechanism 126 may include for example, a shuttle car having wheels or other moving mechanism such as for example, retractable arms which allow sliding the shuttle car forward and backward. Shuttle car 126 may be adapted to slide under cars 118 and to lift the cars and transport them between platform 124 and a respective parking space on any one of decks 110-114, and bottom floor 116. Alternatively to shuttle car 126, other vehicle conveying mechanisms may be used, which may include a crane, a lift, an elevator, a movable platform, a conveyor, or any other type of equipment suitable for moving and/or lifting cars 118 and transporting them to and from their respective parking space in first multi-level parking wing 102 and second multi-level parking wing 104.

Figure 2A:
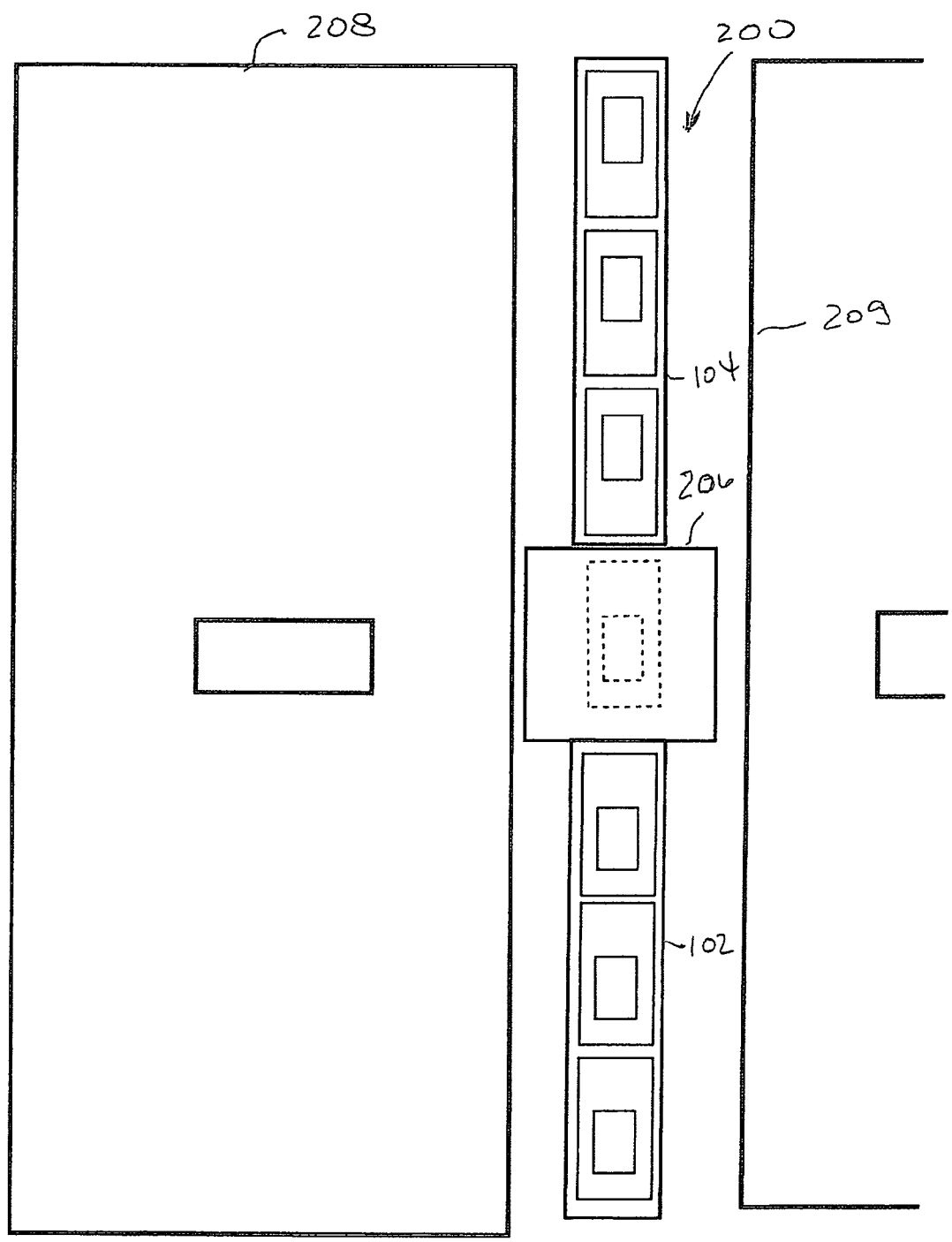
FIGS. 2A and 2B schematically illustrate a top view and a side view, respectively, of an exemplary I-shaped automated parking system, according to an embodiment of the present invention.
Figure 2B:
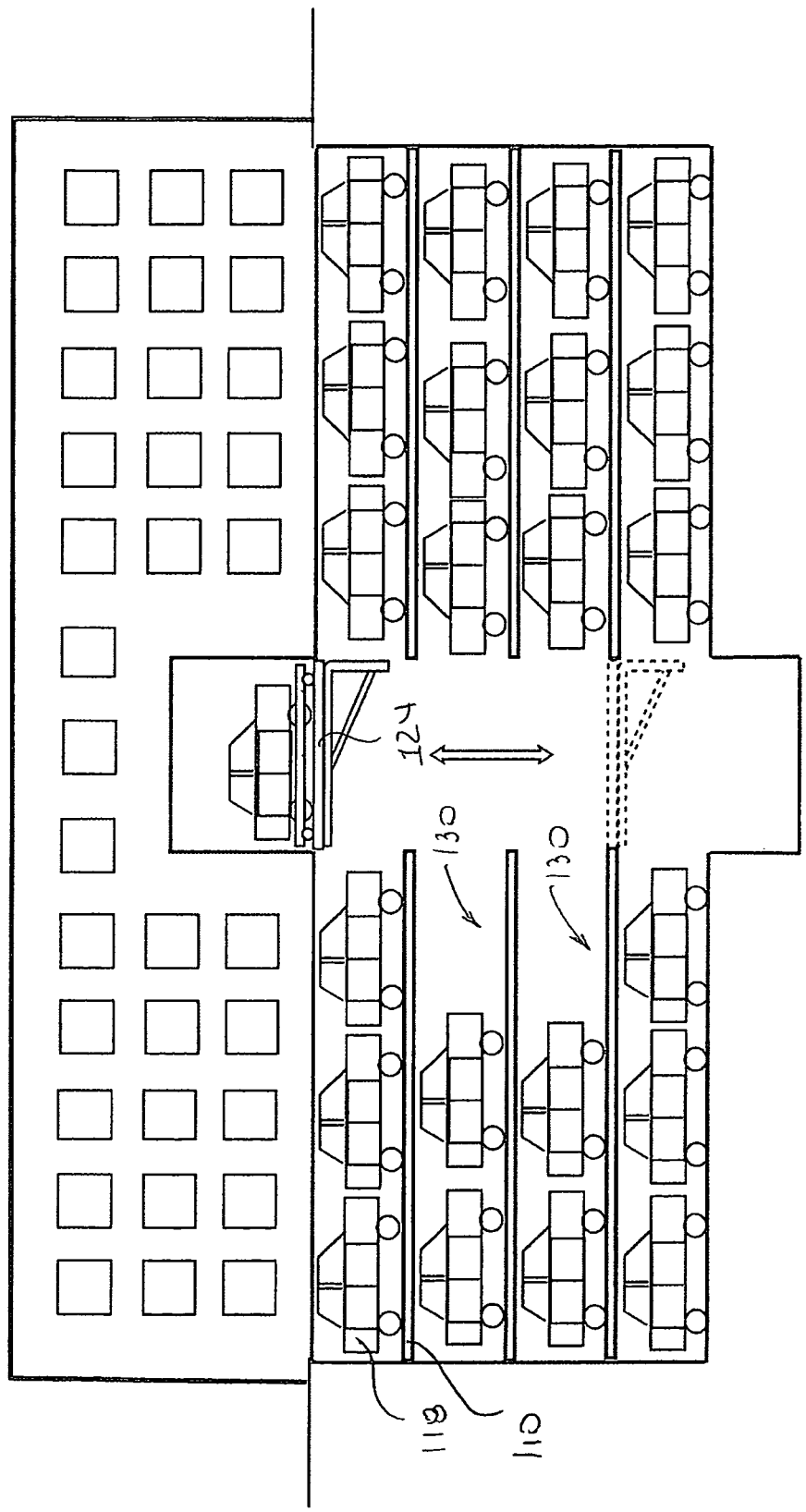

Reference is now made to FIGS. 2A and 2B which schematically illustrate a top view and a side view, respectively, of an exemplary I-shaped automated parking system 200, according to an embodiment of the present invention. Automated parking system 200 may be configured to fit into a narrow tract of land between two buildings 208 and 209 or otherwise other type of structure or boundary. Automated parking system 200 may be functionally similar to automated parking system 100 in FIGS. 1A and 1B with variations that may include first multi-level parking wing 102 and second multi-level parking wing 104 being axially aligned (in a same direction) instead of perpendicularly oriented (as in FIGS. 1A and 1B). Central shaft 206 may be configured to place and retrieve cars 118 in both axially aligned first multi-level parking wing 102 and second multi-level parking wing 104. Platform 124 may be rotatable 180 degrees, optionally in a clockwise direction and a counterclockwise direction, for positioning cars 118 facing front-section or tail-section into first multi-level parking wing 102 and second multi-level parking wing 104. Additionally or alternatively, cars 118 may be rotated on platform 124 so that the doors on one side of the vehicle face into first multi-level parking wing 102 or second multi-level parking wing 104, according to where the vehicle is to be parked. Automated parking system 200 may include at least two shift spaces 130, one space less than a maximum number of cars 118 in any one deck, for example, 3 cars in deck 110.

Figure 3A:
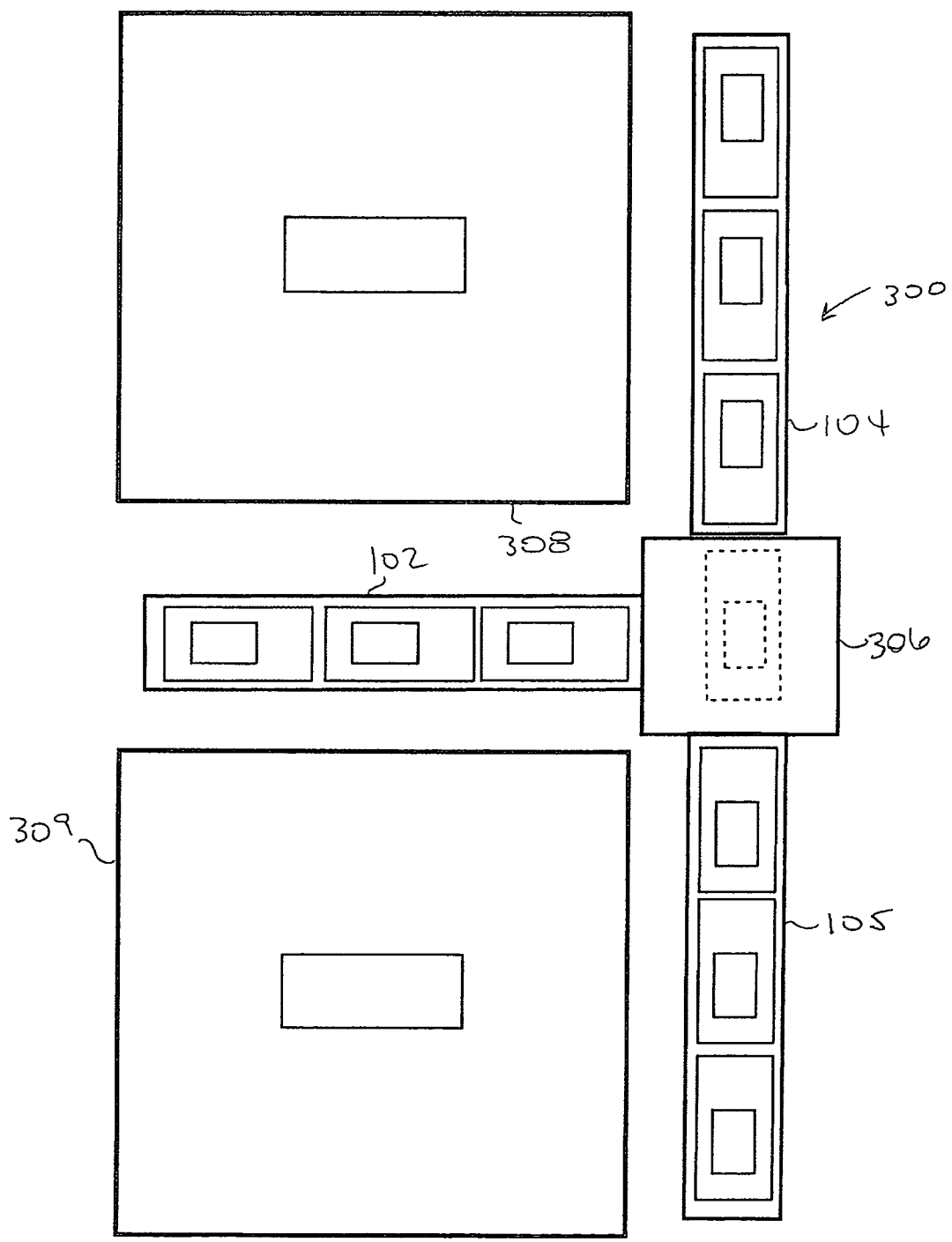
FIGS. 3A and 3B schematically illustrate a top view and a side view, respectively, of an exemplary T-shaped automated parking system, according to an embodiment of the present invention.
Figure 3B:
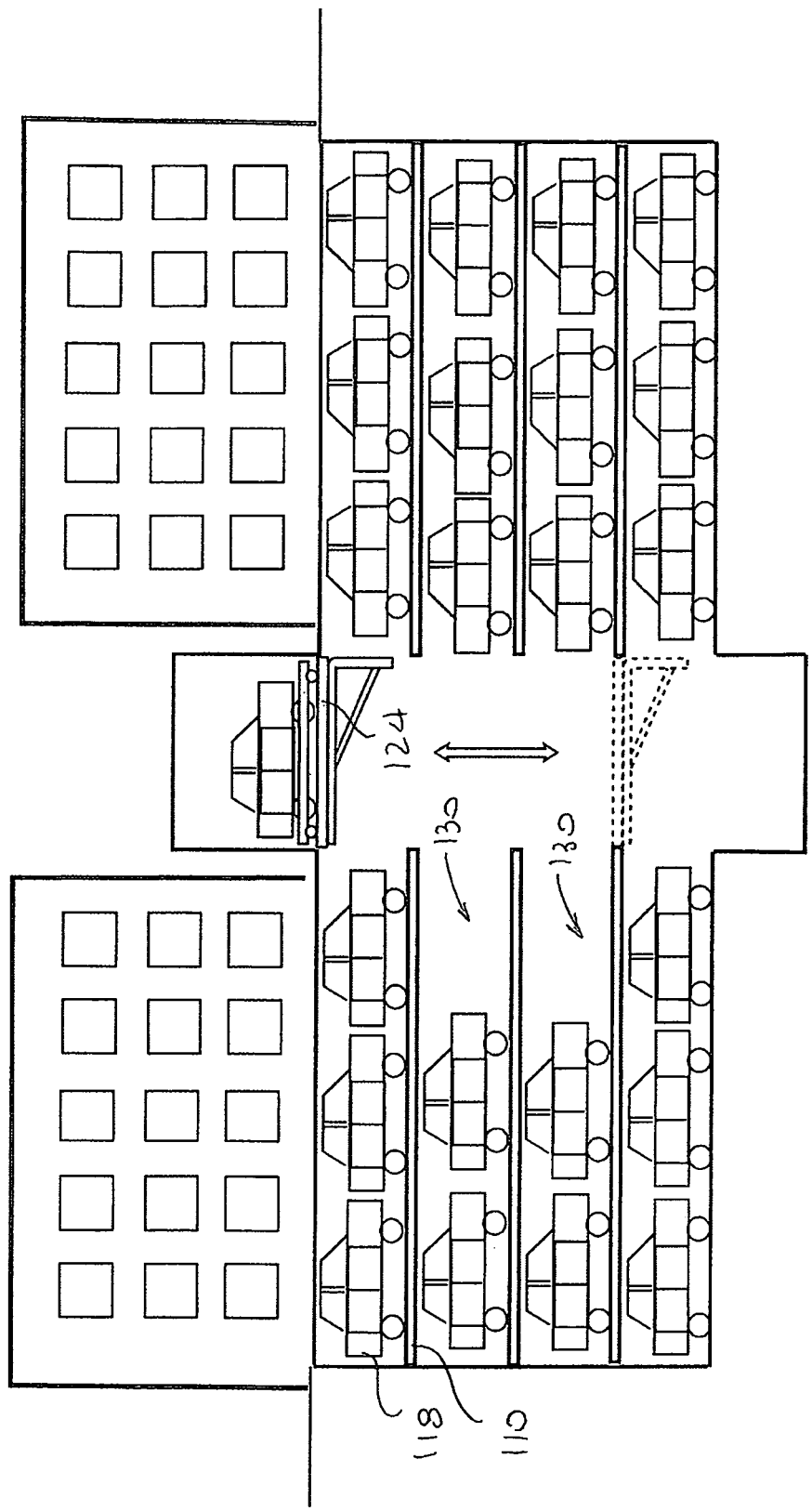

Reference is now made to FIGS. 3A and 3B which schematically illustrate a top view and a side view, respectively, of an exemplary T-shaped automated parking system 300, according to an embodiment of the present invention. Automated parking system 300 may be configured to fit into a narrow tract of land alongside and between two buildings 308 and 309 or otherwise other type of structure or boundary. Automated parking system 300 may include three multi-level parking wings arranged in a configuration which may combine the automated parking system 100 in FIGS. 1A and 1B, and automated parking system 200 in FIGS. 2A and 2B. Automated parking system 300 may include first multi-level parking wing 102 perpendicularly oriented to second multi-level parking wing 104, and a third multi-level parking wing 105 axially aligned with the second multi-level parking wing. Central shaft 306 may be configured to allow placing and retrieving cars 118 in all three wings. Platform 124 may be rotatable over a distance of at least 270 degrees, and possibly over 360 degrees, optionally in both directions, for positioning cars 118 facing into first multi-level parking wing 102, second multi-level parking wing 104, and third multi-level parking wing 105, according to the location where the vehicles are to be parked. Automated parking system 300 may include at least two shift spaces 130, one space less than a maximum number of cars 118 in any one deck in any wing, for example, 3 cars in deck 110.

Reference is now made to FIG. 4A which schematically illustrates a top view of an exemplary L-shaped automated parking system 400 including two rows of parking in a first multi-level parking wing 402 and a second multi-level parking wing 404, according to an embodiment of the present invention. Automated parking system 400 is substantially functionally similar to automated parking system 100 in FIGS. 1A and 1B with variations that may include first multi-level parking wing 402 and second multi-level parking wing 404 each accommodating two rows of cars 118 instead of a single row shown for automated parking system 100. Central shaft 406 may include suitable lifting mechanisms, positioning mechanisms, and vehicle conveying mechanisms similar to those previously described and configured for placing and retrieving cars 118 parked in two rows. Automated parking system 400 may be included in a narrow tract of land bordering a building 408 or otherwise other type of structure or boundary.

Reference is made to FIG. 4B which schematically illustrates a top view of an exemplary single-wing I-shaped automated parking system 500, according to an embodiment of the present invention. Automated parking system 500 may be substantially functionally similar to automated parking system 100 in FIGS. 1A and 1B with variations that may include the automated parking system having only one wing instead of two, for example, first multi-level parking wing 102. Central shaft 506 may include suitable lifting mechanisms, positioning mechanisms, and vehicle transport mechanisms similar to those previously described and configured for placing and retrieving cars 118 parked in only one wing. As there is only one wing, the platform may not need to be rotatable, although it may be. Automated parking system 500 may be included in a narrow tract of land bordering a building 508 or otherwise other type of structure or boundary.

The exemplary embodiments of automated parking systems 100-500 described above, in the various configurations shown, are not intended to be limiting and a person skilled in the art may realize that the present invention may be practiced including other configurations and variations. For example, some embodiments may include a cross-shaped automated parking system (4 wings), other embodiments may combine several automated parking systems forming a square-shape surrounding a structure or a u-shape and may include two central shafts with lifting mechanisms and positioning mechanisms, while other embodiments may include wings with multiple rows (other than two rows, for example, 3 rows, 4 rows, 5 rows, or more), Reference now made to FIG. 5 which schematically illustrates a functional block diagram of an exemplary vehicle positioning system 600 which may be included in automated parking systems 100-500, according to an embodiment of the present invention. Vehicle parking system 600 includes a controller 602, a vehicle registration module 604, a vehicle tracking module 606, a vehicle conveyor drive mechanism 608, a lift drive mechanism 610, and optional parking space sensor devices 612. Vehicle positioning system 600 may be configured to automatically control the operation of automated parking systems 100-500, and may allow automatic parking and retrieving of cars 118 with relatively minimum operator intervention. Operator intervention may include a driver of car 118, or a trained operator of the automated parking system, and may include their driving car 118 in and out of car entry/exit station 120. Operator intervention may additionally include the driver or the trained operator registering car 118 when entering automated parking system 100-500 and/or recalling the car during pick-up of the vehicle. Although automated parking systems 100-500 are described as fully automatic systems, a skilled person may realize that some or all of the functions carried out by controller 602 and the other components in vehicle positioning system 600 may be carried out by human operators.

According to an exemplary embodiment of the present invention, controller 602 may be configured to automatically control major operational aspects of automated parking systems 100-500. These may include processing registration of cars 118 arriving at the car entry/exit station 120; tracking free parking spaces and assigning spaces to cars following registration; tracking parking locations of the vehicles; updating vehicle locations of cars which may be moved into shift spaces 130 to allow access to blocked vehicles; controlling operation of lift 122 and of platform 124; controlling operation of vehicle conveying mechanism 126; and processing requests for retrieval of vehicles from parking spaces.

Controller 602 may process vehicle entry registration information received from vehicle registration module 604 and may use this information to associate a vehicle which is to be parked with its driver. The vehicle entry registration information may include vehicle related information such as, for example, vehicle license plate number, vehicle make and model, driver's name and license number, among other possible relevant information which may be used by the automated parking system in performing tasks associated with automatic parking and retrieval of a vehicle. Based on this information controller 602 may locate a driver's car when the vehicle is to be retrieved and may activate the respective mechanisms required for retrieving the vehicle. Controller 602 may additionally interface with vehicle registration module 604 for determining a payment amount to be paid by the drivers and for receiving a payment confirmation message from the vehicle registration module.

Controller 602 may store information related to available parking spaces and to locations of parked vehicles in vehicle tracking module 606. Controller 602 may also store therein the vehicle entry registration information for each parked car. The information may be used by controller 602 to determine an availability of parking spaces for receiving new cars 118 arriving at car entry/exit station 120, to determine locations of vehicles for retrieving the vehicles when the vehicle driver wishes to depart from automated parking systems 100-500, to determine which vehicles may need to be moved into shift spaces 130 for freeing up blocked cars which are being retrieved by the drivers, among other related functions.

Controller 602 may activate vehicle conveyor drive mechanism 608 which may control shuttle car 126 and which may be used to move cars 118 off lift 122 and into assigned parking spaces. Controller 602 may additionally activate vehicle conveyor drive mechanism 608 which may control shuttle car 126 for retrieving cars from the parking spaces and for loading them onto the lift for moving into a shift space or to the car entry/exit station 120. Controller 602 may activate vehicle conveyor drive mechanism 608 which may control a position of shuttle car 126, as described in the aforementioned Applicant's provisional application related to the positioning mechanism.

Controller 602 may activate lift drive mechanism 610 for moving the lift up and down between the various levels of the parking wings and between the car entry/exit stations in automated parking systems 100-500. Controller 602 may additionally control positioning of platform 124 so that cars 118 may be unloaded from lift 122 facing in the appropriate direction corresponding to the parking wing (for example, first multi-level parking wing 102 or second multi-level parking wing 104) where the parking space is located.

Controller 602 may additionally receive information from parking space sensors 612 adapted to detect available parking spaces and/or occupied parking spaces. Sensors 612 may be further adapted to send information to controller 602 associated with a car 118 parked in a parking space. For example, sensors 612 may be able to image and transmit information to controller 602 associated with a vehicle license plate number or some other vehicle physical feature which may be processed by the controller and may allow identification of the vehicle. Additionally or alternatively, sensors 602 may include one or more sensors suitable for position detection for determining that a parking space is occupied by a vehicle. Sensor 602 may include proximity sensors, imaging devices (e.g. video camera and stills camera), IR detectors, light sensors, laser measurement sensors, IR detectors, contact detectors, among others.

According to an exemplary embodiment of the invention, vehicle registration module 604 may include data input means through which the operator or the driver may input the vehicle entry registration information. Vehicle registration module 604 may additionally include data display means which may serve the driver or operator to interact with automated parking systems 100-500. Registration may be by manually inputting the data or by using magnetic means such as a swipe card, or by communicating using a mobile phone, or by any other suitable means known in the art which may be used for registering the vehicle information into the system including possible use of scanning systems and other types of imaging systems. Vehicle registration module 604 may additionally include means for facilitating driver payment, and may include a printing mechanism for printing receipts.

According to an exemplary embodiment of the present invention, vehicle tracking module 606 may include a database wherein may be stored the vehicle entry registration information, the parking location of each vehicle, and other applicable information associated with the parked vehicles. All of the data, or part of the data, may be stored for an extended period of time for possible future use for a returning driver. Vehicle tracking module 606 may include data storage means located on-premises, may be cloud-based, or may include a distributed storage platform which may be accessed through a local area network or a wide area network (for example, the Internet), or any combination thereof.

Figure 6A:
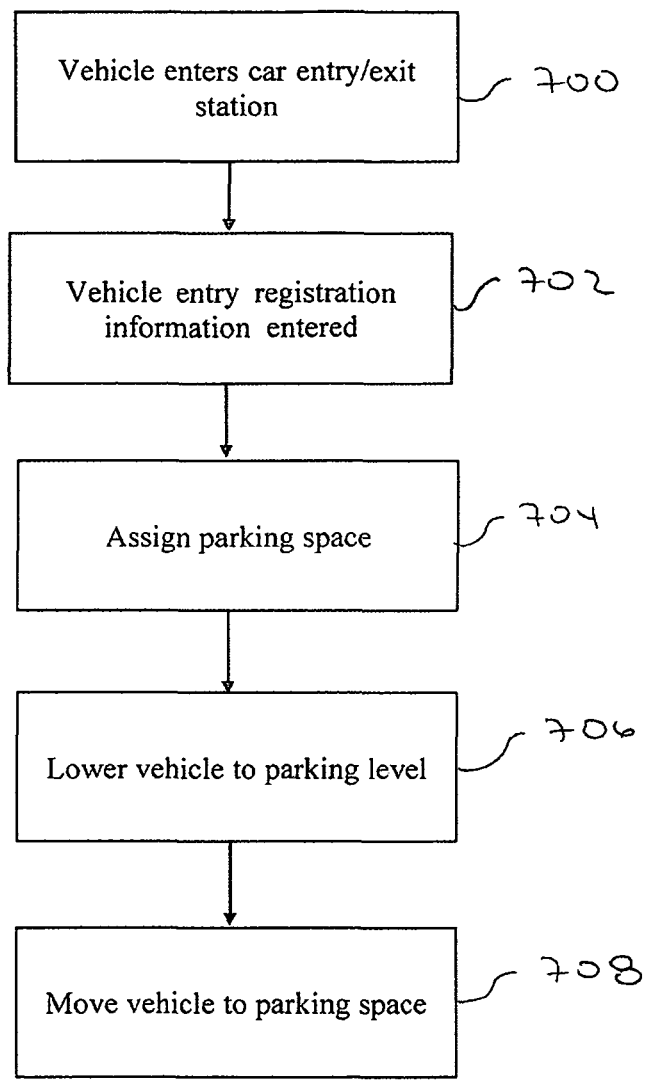
FIGS. 6A and 6B illustrate flow diagrams of an exemplary method of using an automated parking system, according to an embodiment of the present invention.
Figure 6B:
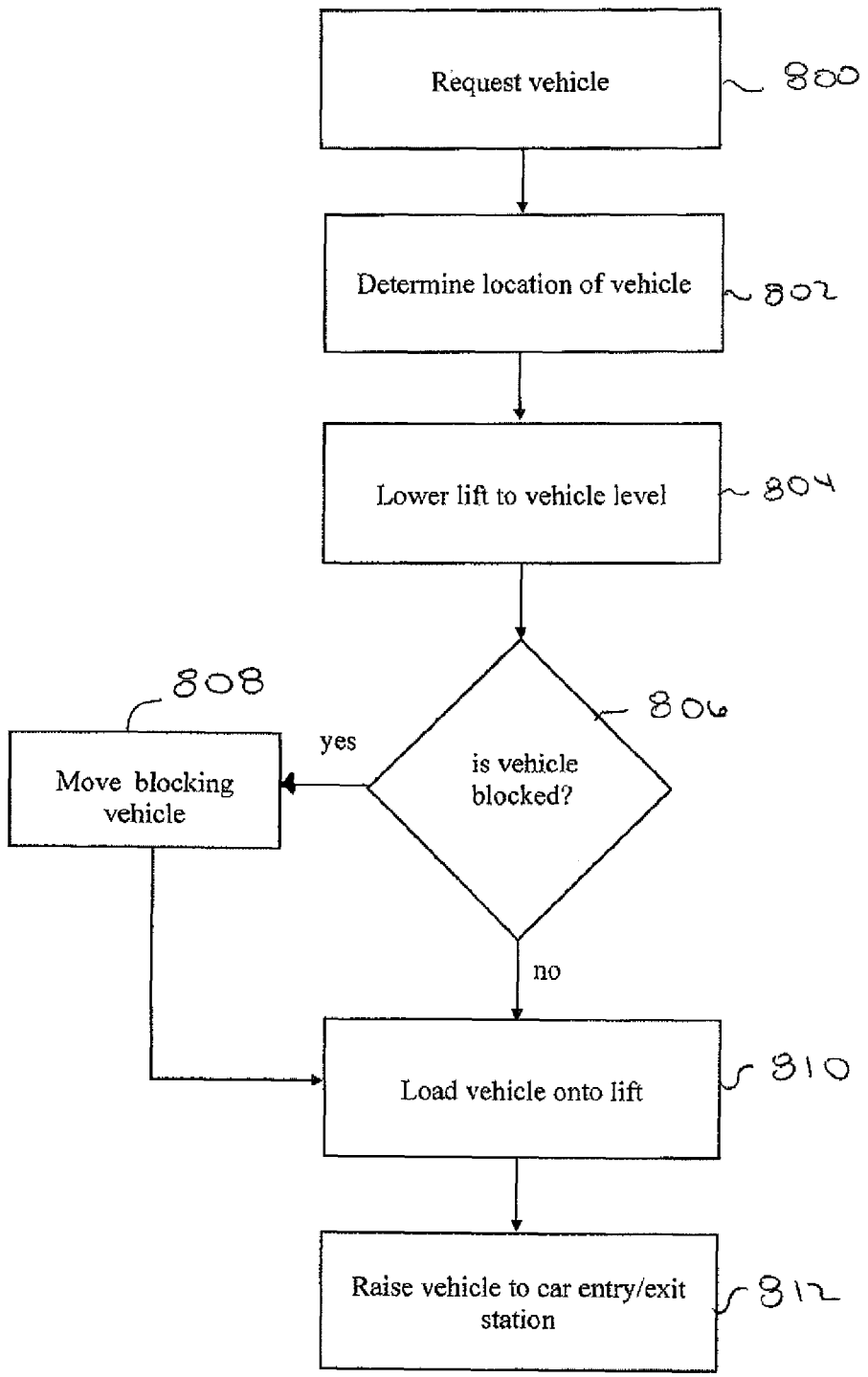

Reference is now made to FIGS. 6A and 6B which illustrate flow diagrams of an exemplary method of using an automated parking system, according to an embodiment of the present invention. FIG. 6A is described with reference to parking a vehicle in the automated parking system, and FIG. 6B is described with reference to retrieving the vehicle from the automated parking system. For simplifying the explanation, reference may be made to automated parking system 100 in FIGS. 1A and 1B, and to vehicle positioning system 600 in FIG. 5. Referring now to FIG. 6A:

At 700, a driver may drive a car 118 into car entry/exit station 120 and may position the vehicle on platform 124 by following position guiding means on the platform. Additionally or alternatively, the position guiding means may be included in car entry/exit station 120, for example, as a positioning screen on a wall or lights which may guide the driver and indicate when car 118 is properly positioned.

At 702, the driver may enter the vehicle entry registration information through vehicle registration module 604. The information may be entered manually by the driver, or may be entered using other methods known in the art. An imaging system, for example a camera, may be used to collect vehicle information such as license plate number, model and make. The vehicle entry registration identification may be stored in vehicle tracking module 606. Alternatively, the driver is a regular user and the vehicle entry registration information is previously stored in vehicle tracking module 606. The stored information may be automatically recalled by the user by inputting a recognition code, for example, a member or regular customer code. Additionally or alternatively, automated parking system 100 may include other recognition methods, for example, using imaging to acquire vehicle license plate numbers or an image of the driver.

At 704, controller 602 may process the vehicle entry registration information and may determine a parking space in one of the levels of first multi-level parking wing 102 or alternatively, in second multi-level parking wing 104. Controller 602 may analyze parking space information stored in vehicle tracking module 604 and based on availability, or lack of availability, may decide which parking space to allocate to car 118. Controller 602 may execute an optimization algorithm to determine a "best mode" parking space. For example, the algorithm may consider the vehicle entry registration identification provided by the driver which may include non-identification information, for example, expected time of exit so that a parking space of the vehicle may be influenced by the amount of time the vehicle is expected to remain parked.

At 706, controller 602 may send control signals to lift drive mechanism 610 which may operate lift 122. Lift 122, responsive to lift drive mechanism 610 operation, may descend to the level, for example level 110, which includes the parking space allocated by controller 602. Controller 602 may send real-time control signals to lift drive mechanism 610 which may operate lift 122 also on a real-time basis responsive to the received control signal. Alternatively, controller 602 may transmit the parking space information to lift drive mechanism 610 which may process the information and may store it for possible later use.

At 708, following lift 122 arriving at the level of the parking space, controller 602 may send control signals to lift drive mechanism 610 to rotate platform 124 so that the tail section of car 118 is facing in a direction into either first multi-level parking wing 102 or second multi-level parking wing 104, according to the parking space allocated by the controller. Alternatively, platform 124 may be rotated so that the front section of car 118 is facing into either first multi-level parking wing 102 or second multi-level parking wing 104. Alternatively, the position of platform 124 was previously sent in the control signals for operating lift 122. Following proper positioning of platform 124 (if not previously properly positioned), controller 602 may send control signals to vehicle conveyor drive mechanism 608 to activate shuttle car 126 and move car 118 to its allocated parking space. Responsive to the activation, shuttle car 126 may unload car 118 from platform 124 and may move the vehicle to its parking space. Cars 118 may be aligned in a row in a bumper-to-bumper arrangement, or alternatively, door-to-door arrangement. Following placement of the vehicle, shuttle car 126 may be returned to platform 124. Control signaling from controller 602 may signal lift drive mechanism 610 to return lift 122 to car entry/exit station 120 for receiving a new vehicle. Alternatively, lift 122 may remain in its present position pending lift drive mechanism 610 receiving new commands from controller 602, and which may include retrieving a vehicle or moving a vehicle into a shift space 130. Controller 602 may additionally send control signals to lift drive mechanism 610 to operate lift 122 and to retrieve car entry/exit station 120 into the ground, for example, when there are relatively long periods of inactivity (e.g. minimum 3 hours), or when automated parking system 100 is closing down (e.g. overnight closing).

Referring now to FIG. 6B:

At 800, a driver wishing to retrieve car 118 parked in automated parking system 100 requests the vehicle. Vehicle requests may be made, for example, through vehicle registration module 604. The request may be made by manually inputting the request, or using other request methods known in the art.

At 802, controller 602 may receive a vehicle request signal from vehicle registration module 604 responsive to the driver's request. Controller may search in vehicle tracking module 606 for the last updated parking location of the driver's vehicle, which may be, for example, in one of the levels of first multi-level parking wing 102 or of second multi-level parking wing 104.

At 804, controller 602 may send control signals to lift drive mechanism 610 to operate lift 122 and transport it to the level of the allocated parking space. Once at the proper level, controller 602 may send control signals to lift drive mechanism 610 for rotating platform 124. Alternatively, the control signals for rotating platform 124 were previously sent, for example, together with the control signals for moving lift 122.

At 806, controller may determine, based on the allocated parking space of car 118 and the allocation of parking spaces to other vehicles, if the vehicle is inside a row and may be blocked by another at least one vehicle. If controller 602 determines that car 118 may be blocked continue to step 808. Otherwise, continue to step 810.

At 808, controller 602 sends control signals to vehicle conveyor drive mechanism 608 to operate shuttle car 126 and load the blocking vehicle onto lift 122. Once placed on lift 122, controller 602 may send a control signal to lift drive mechanism 610 to operate lift 122 and transport the blocking vehicle to a level having at least one shift space 130. Once lift 122 is at the level having shift space 130, controller 602 may instruct vehicle conveyor drive mechanism 608 to move the blocking vehicle off lift 122 and into shift space 130. This step may be repeated as many times as there may be vehicles blocking car 118 to be retrieved. Once all blocking vehicle have been moved, continue to 810. In automated parking systems having more than one row in a level, it may be possible to move a vehicle from parking space in one row into a shift space in the adjacent row, possibly eliminating the need for lift 122 transportation to a shift space in another level.

At 810, controller 602 sends control signals to vehicle conveyor drive mechanism 608 to operate shuttle car 126 and load the car 118 to be retrieved onto lift 122.

At 812 once placed on lift 122, controller 602 may send a control signal to lift drive mechanism 610 to operate lift 122 and transport car 118 to car entry/exit station 120. At car entry/exit station 120, car 118 may be positioned using platform 124 so it is facing in a direction out of the station and the driver may drive the vehicle out of the station.

It may be noted that a person skilled in the art practicing embodiments of the present invention may realize that the exemplary methods previously described may be carried out with variations, for example, using more or less steps, and/or varying the sequence of steps.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An automated parking system comprising:
   a multi-level vehicle parking structure comprising:
   a lift shaft accommodating a vehicle transport lift;

at least one multi-level parking wing connected to said lift shaft and having a width suitable for accommodating a maximum of two rows of parking spaces in each level of said parking wing, said parking spaces extending in a direction away from said lift shaft, and comprising shift spaces proximally located to said lift shaft on multiple levels to accommodate vehicles which interfere with moving said cars in and out of said parking spaces; and an automatic vehicle positioning system configured to position and retrieve vehicles in said parking spaces, and further configured to shift one or more vehicles between said shift spaces in said multiple levels, for retrieving one or more other vehicles in said parking spaces;

wherein a number of shift spaces in said vehicle parking structure is at least one less than a maximum number of vehicles alignable in one row.

2. An automated parking system according to claim 1 wherein said vehicle positioning system includes:

a controller;

a vehicle registration module for registering entry of said vehicles to the automated parking system; and a vehicle tracking module for storing information associated with a parking location of said vehicles.

3. An automated parking system according to claim 2 wherein said automatic vehicle positioning system further includes:

a vehicle transport drive mechanism for operating a vehicle transport mechanism responsive to control signaling from said controller; and a lift drive mechanism for operating said lift responsive to control signaling from said controller.

4. An automated parking system according to claim 1 further comprising a platform mounted on said lift for orienting said vehicles in a direction corresponding to a direction of parking.

5. An automated parking system according to claim 4 wherein said platform is rotatable.

6. An automated parking system according to claim 1 further comprising a vehicle transport mechanism for moving said vehicles to and from said multiple parking spaces.

7. An automated parking system according to claim 6 wherein said vehicle transport mechanism includes a shuttle car.

8. An automated parking system according to claim 1 wherein said at least one multi-level parking wing comprises multiple parking wings arranged in one of an L-shaped configuration, a T-shaped configuration, and an I-shaped configuration.

9. An automated parking system according to claim 1 wherein said lift shaft comprises a central shaft.

10. An automated parking system according to claim 1 further comprising a car entry/exit station.

11. An automated parking system according to claim 1 wherein said vehicle positioning system further includes parking space sensors.

12. A multi-level vehicle parking structure comprising:

a lift shaft accommodating a vehicle transport lift;

at least one multi-level parking wing connected to said lift shaft and having a width suitable for accommodating a maximum of two rows of parking spaces in each level of said parking wing, said parking spaces extending in a direction away from said lift shaft, and comprising shift spaces proximally located to said lift shaft on multiple levels to accommodate vehicles which interfere with moving said cars in and out of said parking spaces; and an automatic vehicle positioning system configured to position and retrieve vehicles in said parking spaces, and further configured to shift one or more vehicles between said shift spaces in said multiple levels, for retrieving one or more other vehicles in said parking spaces;

wherein said structure is configured on a narrow tract of land extending along a portion of a length of a building or other type of boundary, and wherein a number of shift spaces in said vehicle parking structure is at least one less than a maximum number of vehicles alignable in one row.

13. A multi-level vehicle parking structure according to claim 12 wherein said at least one multi-level parking wing comprises a first multi-level parking wing and a second multi-level parking wing, and wherein said first parking wing and said second parking wing are substantially perpendicular to each other.

14. A multi-level vehicle parking structure according to claim 13 wherein said lift shaft is positioned at a corner of said first parking wing and said second parking wing.

15. A multi-level vehicle parking structure according to claim 14 wherein said vehicle lift comprises a platform for orienting said vehicles in a direction corresponding to a direction of parking in said first parking wing and said second parking wing.

16. A multi-level vehicle parking structure according to claim 15 wherein said platform is rotatable.

17. A multi-level parking structure according to claim 12 wherein said structure is configured on a narrow tract of land bordering one or more exterior sides of a building.

\* \* \* \* \*